United States Patent
Truong et al.

(10) Patent No.: US 11,350,381 B2
(45) Date of Patent: May 31, 2022

(54) MESH RANGING AND NETWORK MESSAGE AND SLOT STRUCTURE FOR AD-HOC NETWORKS AND METHOD THEREFOR

(71) Applicant: BENCHMARK ELECTRONICS, INC., Scottsdale, AZ (US)

(72) Inventors: Hiep Truong, Scottsdale, AZ (US); Kevin Nguyen, Scottsdale, AZ (US)

(73) Assignee: BENCHMARK ELECTRONICS, INC., Tempe, AZ (US)

( * ) Notice: Subject to any disclaimer, the term of this patent is extended or adjusted under 35 U.S.C. 154(b) by 0 days.

(21) Appl. No.: 16/041,047

(22) Filed: Jul. 20, 2018

(65) Prior Publication Data
US 2019/0132906 A1    May 2, 2019

Related U.S. Application Data

(60) Provisional application No. 62/577,566, filed on Oct. 26, 2017.

(51) Int. Cl.
  *H04W 64/00* (2009.01)
  *H04W 8/00* (2009.01)
  (Continued)

(52) U.S. Cl.
  CPC .............. *H04W 64/003* (2013.01); *G01S 5/22* (2013.01); *H04L 45/126* (2013.01);
  (Continued)

(58) Field of Classification Search
  CPC ........... H04W 64/003; H04W 52/0206; H04W 16/18; H04W 64/00; H04W 56/002;
  (Continued)

(56) References Cited

U.S. PATENT DOCUMENTS 6,058,102 A * 5/2000 Drysdale .................. H04L 1/24
                                                        370/248
7,280,518 B2 * 10/2007 Montano ........... H04L 29/12009
                                                        370/338
(Continued)

FOREIGN PATENT DOCUMENTS

KR          101464667          11/2014
WO         2010000093           1/2010

OTHER PUBLICATIONS

Chapter of an unknown book, published at least by Jul. 5, 2017 as retrieved by "https://web.archive.org/web/20170705130046/http://www.scs.ryerson.ca/~jmisic/papers/chapterMisicKhairMisic.pdf", by Muhi et al.*

(Continued)

*Primary Examiner* — Nishant Divecha
(74) *Attorney, Agent, or Firm* — Weiss & Moy, P.C.; Jeffrey D. Moy

(57) ABSTRACT

A method for establishing timing and processing of network messages in a wireless ad-hoc network comprising: establishing a network identification (ID) when the wireless ad-hoc network is unestablished; and establishing a local timing in the wireless ad-hoc network, the local timing having a network data frame structure, each network data frame in the network data frame structure having a plurality of network slot times, wherein each network slot time is designated as one of an assigned network slot time or a shared network slot time, each wireless node in the wireless ad-hoc network designated as one of an assigned wireless node or an unassigned wireless node, each assigned wireless node initiating and transmitting network messages in a corresponding assigned network slot time or any available shared network slot time, and each unassigned wireless node (Continued)

initiating and transmitting network messages only in any available shared network slot time.

13 Claims, 7 Drawing Sheets

(51) Int. Cl.
| | |
|---|---|
| *H04W 88/18* | (2009.01) |
| *H04W 72/04* | (2009.01) |
| *H04W 84/18* | (2009.01) |
| *H04W 74/08* | (2009.01) |
| *H04W 74/02* | (2009.01) |
| *G01S 5/22* | (2006.01) |
| *H04W 56/00* | (2009.01) |
| *H04L 45/12* | (2022.01) |
| *H04W 16/18* | (2009.01) |
| *H04W 52/02* | (2009.01) |

(52) U.S. Cl.
CPC .......... *H04W 8/005* (2013.01); *H04W 16/18* (2013.01); *H04W 52/0206* (2013.01); *H04W 56/002* (2013.01); *H04W 64/00* (2013.01); *H04W 74/02* (2013.01); *H04W 74/0816* (2013.01); *H04W 88/184* (2013.01); *H04W 72/0446* (2013.01); *H04W 84/18* (2013.01)

(58) Field of Classification Search
CPC ... H04W 88/184; H04W 8/005; H04W 74/02; H04W 74/0816; H04W 84/18; H04W 72/0446; H04W 84/12; H04W 72/00; H04W 74/00; H04W 76/00; H04L 45/126; H04L 67/16; H04L 45/12; G01S 5/22

See application file for complete search history.

(56) References Cited

U.S. PATENT DOCUMENTS

| | | |
|---|---|---|
| 2006/0056370 A1 | 3/2006 | Hancock et al. |
| 2006/0066455 A1 | 3/2006 | Hancock et al. |
| 2007/0076681 A1* | 4/2007 | Hong ................ H04L 29/12216 370/349 |
| 2007/0184864 A1* | 8/2007 | Leitch ............... H04W 56/0015 455/507 |
| 2009/0046005 A1 | 2/2009 | Namineni et al. |
| 2011/0002243 A1 | 1/2011 | Sherman et al. |
| 2013/0100850 A1* | 4/2013 | Zhang .................. G01S 5/0205 370/254 |
| 2014/0022968 A1 | 1/2014 | Apte et al. |
| 2016/0294622 A1 | 10/2016 | Phillips |
| 2016/0309392 A1 | 10/2016 | Agardh |
| 2017/0055131 A1 | 2/2017 | Kong et al. |
| 2017/0140637 A1 | 5/2017 | Thurlow et al. |

OTHER PUBLICATIONS

ZigBee and IEEE 802.15.4 Protocol Layers Shahin Farahani, in ZigBee Wireless Networks and Transceivers, 2008 (Year: 2008).*
Article CoR-MAC: Contention over Reservation MAC Protocol for Time-Critical Services in Wireless Body Area Sensor Networks, Published: May 9, 2016 (Year: 2016).*
Measure The Range Of Sensor Networks R.A. Abd-Alhameed, D. Zhou, C.H. See, Y.F. Hu, K.V. Horoshenkov Source: http://www.mwrf.com/test-and-measurement/measure-range-sensor-networks.

* cited by examiner

MESH RANGING AND NETWORK MESSAGE AND SLOT STRUCTURE FOR AD-HOC NETWORKS AND METHOD THEREFOR

RELATED APPLICATIONS

This patent application is related to U.S. Provisional Application No. 62/577,566 filed Oct. 26, 2017, entitled 'INTERNET OF THINGS (IOT) ARCHITECTURE" in the name of Hiep Truong, Kevin Nguyen, Ron Hobbs, and Jim Luecke, and which is incorporated herein by reference in its entirety. The present patent application claims the benefit under 35 U.S.C § 119(e).

TECHNICAL FIELD

The present application relates generally to the technical field of wireless networks, and more specifically, to the technical field of mesh ranging and network message and slot structure for ad-hoc networks.

BACKGROUND

An ad hoc wireless network may be defined as a network that may be composed of individual devices wireless communicating with each other directly. These types of networks may bypass a central access point such as a router. Ad hoc wireless networks may eliminate the complexities of infrastructure setup and administration, enabling wireless devices to create and join networks on-the-fly-anywhere-anytime, for virtually any application. Ad hoc wireless networks may exist without any existing stationary infrastructure.

Ad hoc wireless networks and wireless sensor networks are often deployed in an ad hoc fashion, that is, their location is generally not known a priori, creating a dynamic nature of wireless nodes/sensor nodes. Furthermore, in many situations, it is very difficult to establish wireless infrastructure to provide reference nodes such, as a base station or hub.

Many ad hoc wireless system applications may require ad-hoc localization techniques. For example, in the wireless sensor network domain, wireless sensor nodes are typically randomly deployed. In many situations, GPS location information may be unavailable and/or does not work in all places. GPS location information may be prohibitive due to cost and power requirements. In another example, sensor network operations and services may rely on the knowledge of sensor positions, including coverage area management, and geographic-aware routing for more efficient data routing (i.e., multi-hops data routing) in larger networks that span large geographic regions.

Thus, a wireless sensor's location generally needs to be known for its data to be meaningful. Localization is necessary to provide a physical context to a sensor's readings. For example, in many applications such as environmental monitoring, sensor readings without knowledge of the location where the readings were obtained are meaningless. Location information is further necessary for services such as intrusion detection, inventory and supply chain management, and surveillance. Location discovery is also becoming an important component for establishing correspondence between the Internet and the physical world; and mechanism for discovering spatial relationships among wireless nodes (i.e., objects or people).

Therefore, it would be desirable to provide a system and method that overcomes the above. It is desirable to develop ad hoc location discovery techniques that will operate in the same set of dynamic conditions as ad hoc communication protocols to support robust ad-hoc network operations.

SUMMARY

In accordance with one embodiment, a method for establishing timing and processing of network messages in a wireless ad-hoc network is disclosed. The method comprises: establishing a network identification (ID) when the wireless ad-hoc network is unestablished; and establishing a local timing in the wireless ad-hoc network, the local timing having a network data frame structure, each network data frame in the network data frame structure having a plurality of network slot times, wherein each network slot time is designated as one of an assigned network slot time or a shared network slot time, each wireless node in the wireless ad-hoc network, designated as one of an assigned wireless node or an unassigned wireless node, each assigned wireless node initiating and transmitting network messages in a corresponding assigned network slot time or any available shared network slot time, and each unassigned wireless node initiating and transmitting network messages only in any available shared network slot time.

In accordance with one embodiment, a method for establishing timing and processing of network messages in a wireless ad-hoc network is disclosed. The method comprises: establishing a network identification (ID) when the wireless ad-hoc network is unestablished; establishing a local timing in the wireless ad-hoc network, the local timing having a network data frame structure, each network data frame in the network data frame structure having a plurality of network slot times, wherein each network slot time is designated as ore of an assigned network slot time or a shared network slot time, each wireless node in the wireless ad-hoc network designated as one of an assigned wireless node or an unassigned wireless node, each assigned wireless node initiating and transmitting network messages in a corresponding assigned network slot time or any available shared network slot time, and each unassigned wireless node initiating and transmitting network messages only in any available shared network slot time; wherein establishing a network ID comprises: scanning for the network messages by an active wireless node; determining a type of network message when a network message is detected; generate a network ID message if no wireless ad-hoc network has been established and no network messages are detected; and transmitting the network ID message at an initial network slot time (SN0); and scanning for the network messages when the wireless ad-hoc network is established.

BRIEF DESCRIPTION OF THE DRAWINGS

The present application is further detailed with respect to the following drawings. These figures are not intended to limit the scope of the present application but rather illustrate certain attributes thereof. The same reference numbers will be used throughout the drawings, to refer to the same or like parts.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

The present disclosure relates to a system and method wherein wireless nodes cooperatively form a network independently of any fixed base station and/or hub infrastructure Each wireless node may communicate directly with destinations within wireless range and indirectly with other destination nodes, relying on adjacent nodes in wireless range to forward traffic on its behalf. The system may use a system data frame with dynamic network slots structure consists of assigned networks slots and shared network slots for communication.

Figure 1:
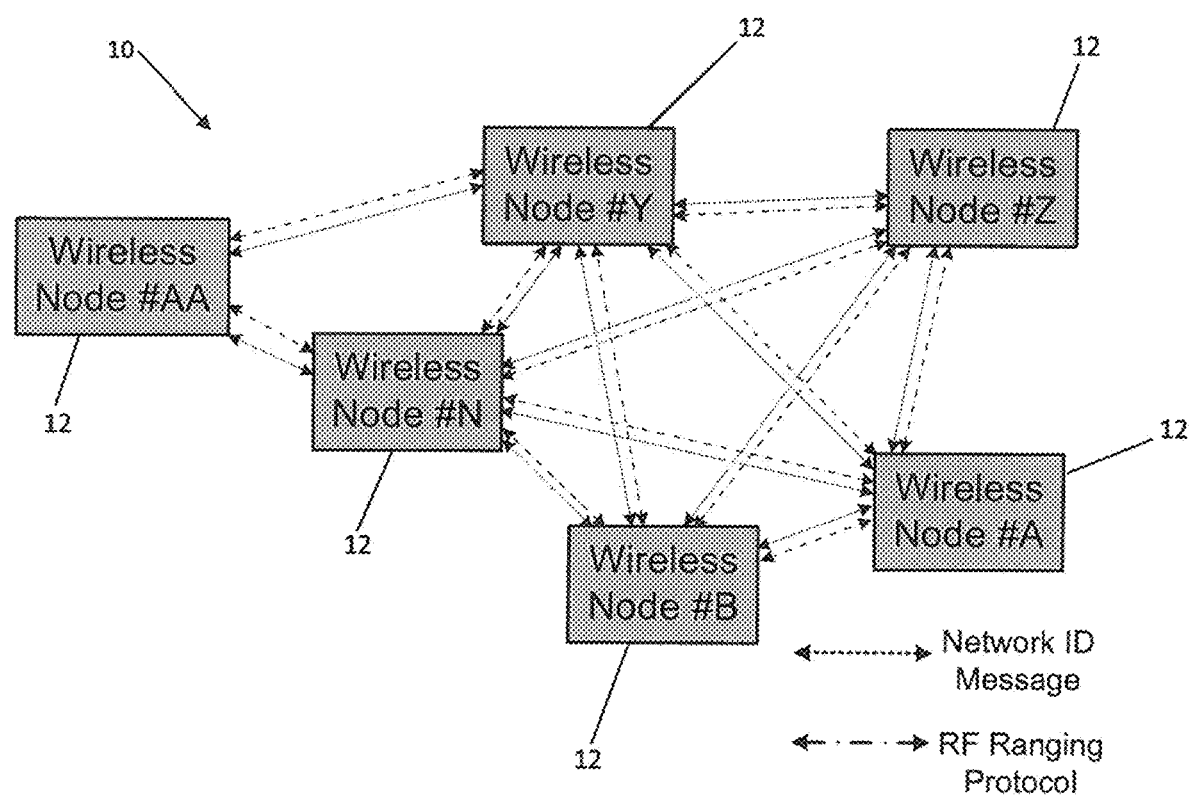
FIG. 1 is an exemplary block diagram depicting mesh ranging in an ad-hoc wireless network in accordance with one aspect of the present application.

Referring to FIG. 1, a wireless ad hoc network 10 may be seen. The wireless ad hoc network 10 is a dynamic type of network have a plurality of wireless nodes 12. Wireless nodes 12 may be added to, removed or moved from one location to another within the wireless ad hoc network 10 without notice. The wireless ad hoc network 10 may be designed such that disjoined groups of wireless nodes 12 may merge together when they are nearby or come close to within communication, range of each other to form the wireless ad hoc network 10. By the same token, a group of wireless nodes 12 may split into smaller groups as wireless nodes 12 are moving away from each other.

Once timing has been established as described below, the wireless nodes 12 may be able to wirelessly communicate with each other directly or indirectly. The wireless nodes 12 cooperatively form the wireless ad hoc network 10 independently of any fixed base station and/or hub infrastructure. Each wireless node 12 communicates directly with other wireless nodes 12 within wireless range and indirectly with other wireless nodes 12 not in wireless range by relying on other wireless nodes 12 within wireless range to forward traffic on its behalf. The wireless nodes 12 may be any type of electronic device that is capable of creating, receiving, or transmitting information over a communications channel.

In the wireless ad hoc network 10, information relating to the position of the wireless sensors 12 may be needed for different reasons such as, but not limited to, coverage area management, geographic-aware routing for more efficient data routing (i.e., multi-hops data routing) in larger networks that span large geographic regions and the like. The wireless ad hoc network 10 may provide ad-hoc location discovery to provide support for system self-calibration to, accelerate network deployment and infrastructure installation in order to reduce cost and delay associated with the installation and calibration of a system as may be described below.

Location discovery in the wireless ad hoc network 10 may involves ranging measurement and location estimation. Ranging measurement is where the wireless nodes 12 estimate its distance from its neighbors. Location estimation is where the wireless nodes 12 use ranging information from multiple reference nodes to estimate their positions (either relative or global positions). The above will be further disclosed below.

As may be seen in FIG. 1, the wireless nodes 12 may be shown as wireless nodes #A-#N, Wireless Nodes #Y-#Z and wireless node #AA. Each of the wireless nodes #A-#N and #Y-#Z may be able to wirelessly communicate with each other directly as shown by the Network Message and RF Ranging Protocol signal lines. While wireless nodes #A, #B and #Z are not directly connected to wireless node #AA, wireless nodes #A, #B, and #Z may still communicate with wireless node #AA by sending communication signals through wireless nodes #N or #Y. Node to node ranging as disclosed below may be used to determined the most direct route for communicating between wireless nodes 12 not in wireless range of each other. Node-to-Node ranging may be enabled via encoding of a Ranging Request Message into a Network ID Message. When encoded, RF range measurement protocols may be enabled and executed using network slot times as disclosed below.

The wireless ad hoc network 10 may be designed to minimize cost and power usage. To minimize cost and power usage, the wireless nodes 12 may be configured not to have any timing information. The wireless nodes 12 may be configured not to have an internal timing source such as a signal clock generator and/or GPS receiver. Thus, the wireless ad hoc network 10 may use an asynchronous (no clock synchronization) RF ranging measurement technique that is mutually coupled with Ad-hoc networking access protocols as disclosed below. In accordance with one embodiment, the wireless nodes 12 may be wireless sensors which may monitor, record and/or transmit data.

In accordance with one embodiment, the wireless nodes 12 may transmit signals to wireless nodes 12 within wireless range in the UWB frequency range. In accordance with one embodiment, wireless nodes 12 may transmit signals to one another in the unlicensed frequency bands of 3 GHz to 6 Hz.

Figure 2:
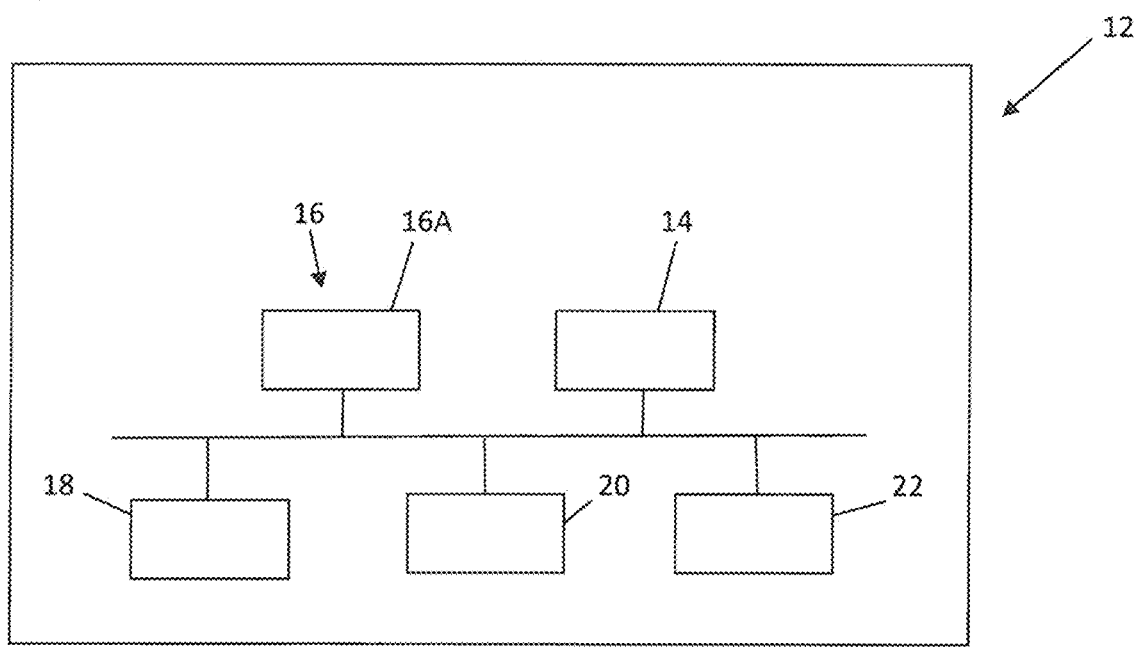
FIG. 2 is an exemplary block diagram of a wireless node used in the ad-hoc wireless network of FIG. 1 in accordance with one aspect of the present application.

Referring to FIG. 2, a block diagram of one embodiment of a wireless node 12 may be seen. The wireless node 12 may have a sensor 14. The sensor 14 may be used to collect sensory data. For example, the sensor 14 may be used to collect noise data, vibration data, pollutant data, and/or other external sensory data.

The wireless node 12 may have a receiver/transmitter 16. The receiver/transmitter may be used to send and receive data to and from the wireless node 12. In accordance with one embodiment, the receiver/transmitter 16 may be an Ultra-Wideband (UWB) receiver/transmitter 16A. The UWB receiver/transmitter 16A may operate in the unlicensed frequency bands of 3 GHz to 6 GHz.

The wireless node 12 may have memory 18. The memory 18 may be used to store sensory data from the sensor 14 some embodiments, sensory data could be transmitted elsewhere for storage via the receiver/transmitter 16. The memory 18 may also be used as a computer-readable storage medium containing instructions for executing a dynamic slot structure for communication between the wireless nodes 12 as will be described below. Such instructions can be executed by a processor 20. The wireless node 12 may be powered by a power source 22. The power source 22 may be a battery or similar device.

In the wireless ad hoc network 10, multiple data sessions may be in progress simultaneously and can share, a single communication channel. Such multiple data sessions can be addressed to multiple destinations. Thus, the wireless ad hoc network 10 should be designed to achieve collision-free transmissions of data frames within time-slots of a single communication channel.

Figure 3:
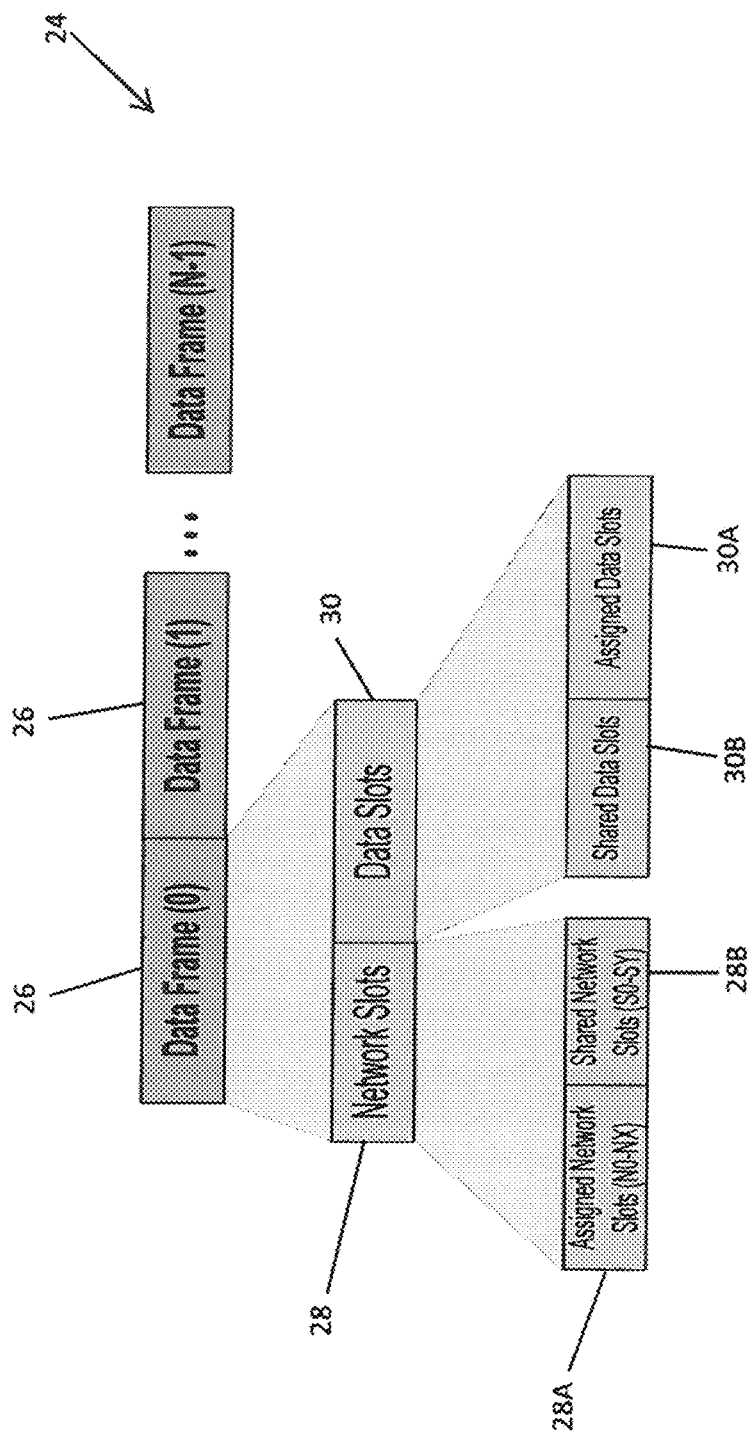
FIG. 3 is an exemplary network data frame and slot structure diagram for the ad-hoc wireless network of FIG. 1 in accordance with one aspect of the present application.

Once the wireless ad hoc network 10 has been established, the wireless ad hoc network 10 may use a network data frame structure 24 as may be seen in FIG. 3 for communication between wireless node 12. The network data frame structure 24 may have a plurality of data frames 26 labeled as Data Frame (0), Data Frame (1), Data Frame (N-1). Each data frame 26 has network slots 28 and associated data slots 30. The network slots 28 may be configured to have a dynamic network slot structure comprising assigned network slots 28A and shared network slots 28B. In the embodiment shown in FIG. 3, the assigned network slots 28A may be shown as assigned network slots (N0-NX) and the shared network slots 288 may be shown as (S0-SY). The assigned network slots 28A and shared network slots 28B may have associated assigned data slots 30A and shared data slots 30B.

Figure 4:
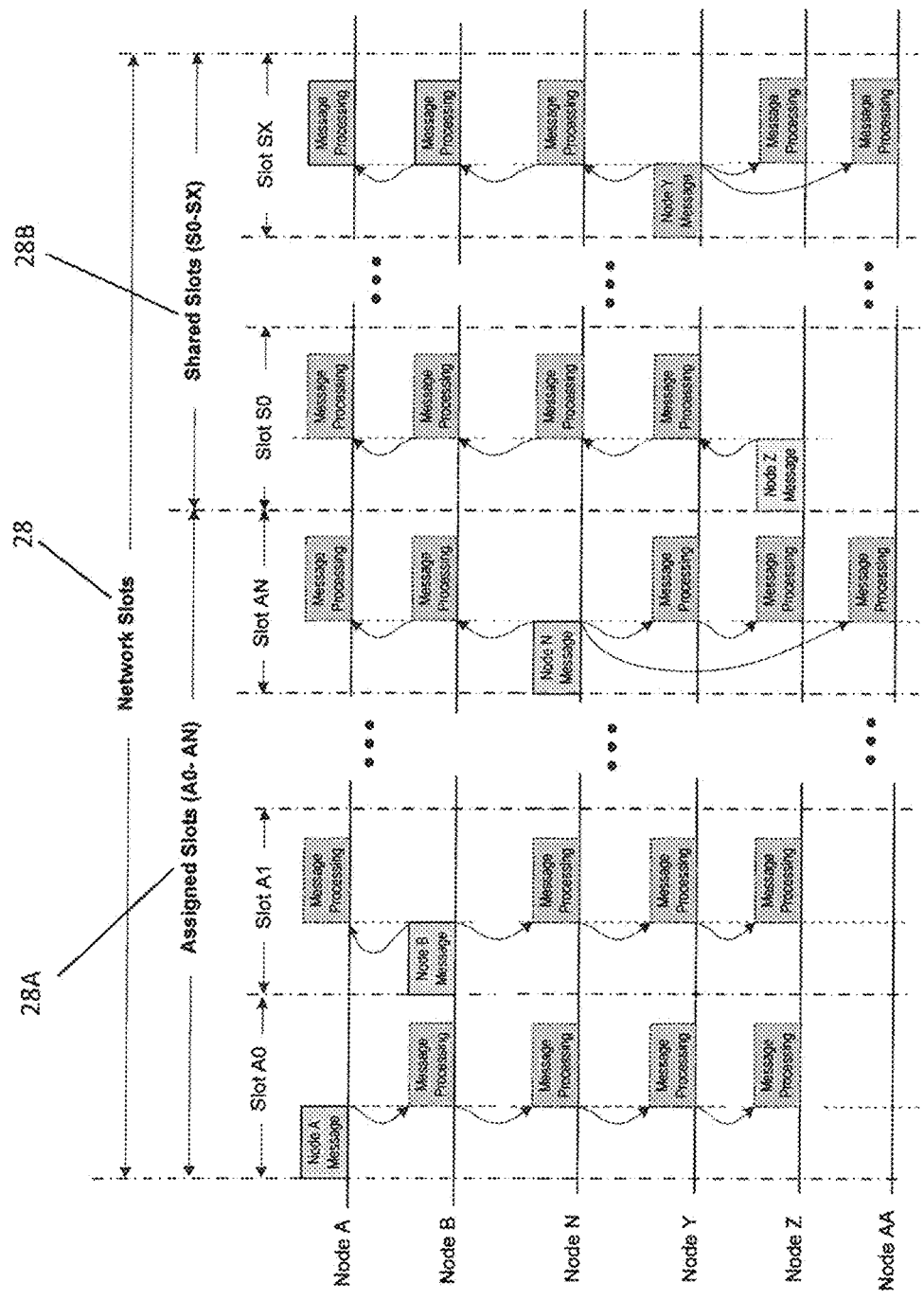
FIG. 4 is an exemplary timing diagram showing network messaging and slot structure for the ad-hoc wireless network of FIG. 1 in accordance with one aspect of the present application.

Referring to FIGS. 1 and 4, network messaging and slot structure may be described. As disclosed above, the network 10 has a dynamic network slot structure comprising assigned network slots 28A and shared network slots 28B. As may be seen in FIG. 4, the wireless nodes 12 identified as wireless Node A –Node N have assigned network slots 28A labeled as Slots A0-AN. Thus, wireless nodes Node A –Node N may initiate and transmit network messages in their assigned network slots 28A (i.e., wireless Node A may transmit in Slot N0, wireless Node 13 may transmit in assigned network slot N1, etc.) or in any shared network slots 28B identified as Shared Slots S0-SX.

In the embodiment show, wireless Node A may transmit a network message in assigned network slots 28A labeled as Slot A0. Since the wireless nodes 12 may listen on any network slot at any time, the wireless Nodes B, N, Y and Z may receive and begin processing the network message during Slot A0. Similarly wireless Node B may transmit a network message in assigned network slots 28A labeled as Slot A1. Since the wireless nodes 12 may list on any network slot at any time, the wireless Nodes A, N, Y and Z may receive d begin processing the network message during Slot A1.

Wireless nodes 12 identified as wireless Nodes Y to Node Z are unassigned wireless nodes and may initiate and transmit their network messages in any shared network slots 28B identified as Shared Slots S0-SX. As shown in FIG. 4, wireless node Y tray transmit a network message in Slot SX, while wireless node Z may transmit a network message in Slot S0. In the present embodiment, wireless Node Y may transmit a network message in unassigned network slots 28B labeled as Slot SX. Since the wireless nodes 12 may listen on any network slot at any time, the wireless Nodes A, B, N and Z may receive and begin processing the network message during Slot SX.

Network messages may consist of network commands, status, requests, response messages and the like.

The wireless nodes 12 identified as wireless Node A Node-N and Node Y-Node Z may listen on any network slot at any time in order to receive and process the network message and/or determine which network slots 24 may be available to initiate and transmit their network messages. However, data contentions may occur when multiple wireless nodes 12 are trying to transmit their network messages in a same shared network slots 28B.

Figure 5:
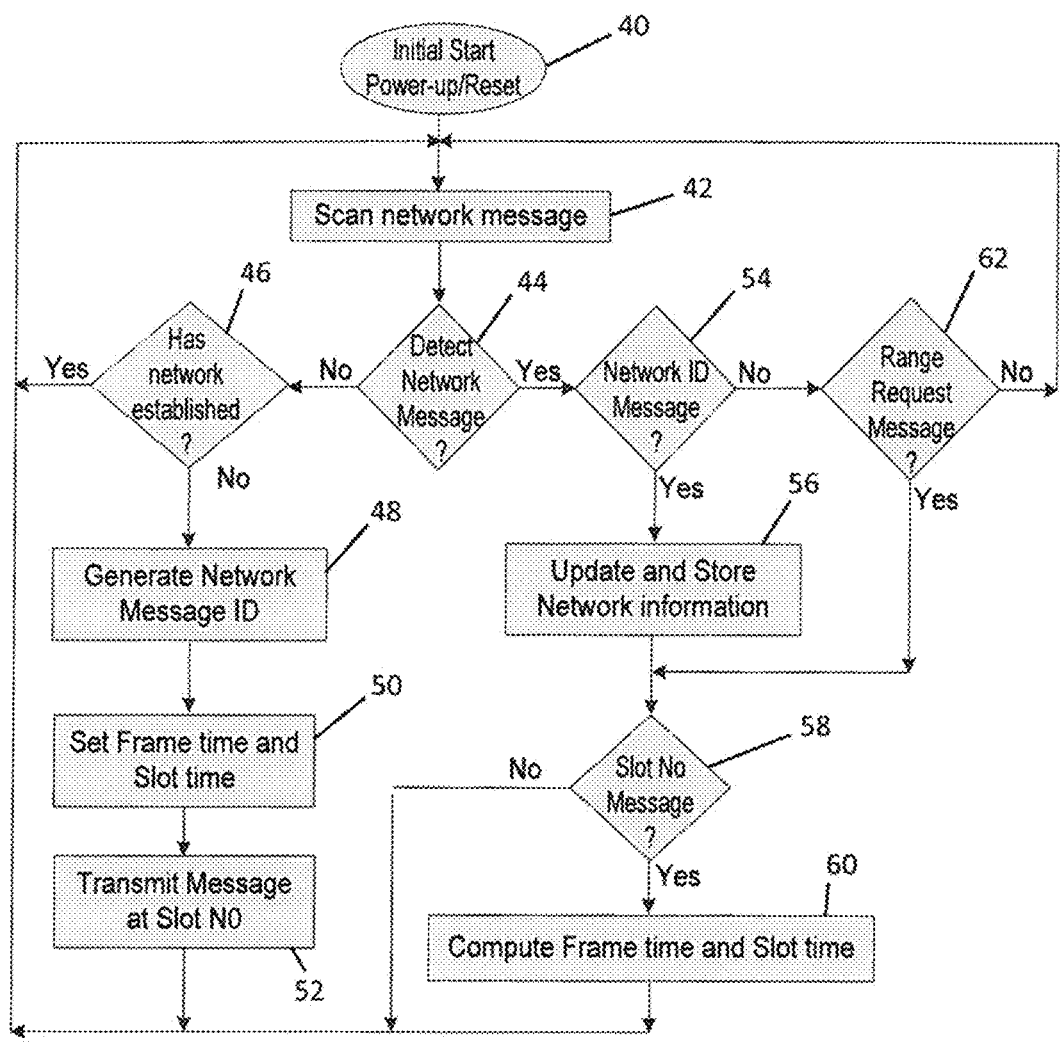
FIG. 5 is an exemplary flowchart showing network messaging and timing establishment for the ad-hoc wireless network of FIG. 1 in accordance with one aspect of the present application.

Referring to FIG. 5, a flowchart may be seen which may show a process for establishing timing for the wireless ad hoc network 10 (FIG. 1). At power-up or at system reset 40, the wireless node 12 may scan for network messages as shown in 42. A determination is made as to whether a network message was detected by the wireless node as shown in 44. If no, network message has been detected, a determination is made by the wireless node 12 if a wireless ad hoc network 10 has been established as shown in 46. If a wireless network has been established, the wireless node 12 may continue to scan for network messages as shown in 42. If no wireless network has been established, the wireless node 12 may generate a network ID message as shown in 48 and may set a network frame time and slot time as shown in 50. The wireless node 12 that has generated the network ID message may be assigned Slot N0 and may then transmit the network ID message at Slot N0 as shown in 52 thereby establishing timing within the ad hoc wireless network 10. The wireless node 12 may then go back to scanning for network messages as shown in 42.

If the wireless node 12 does detect a network message, a determination is made if the network message is a network ID message as shown in 54. If the network message is a network ID message, the wireless node 12 may update and store the network information as shown in 56. The wireless node 12 may determine if there is slot number message as shown in 58. If there is a slot number message, the wireless node 12 may store the slot information which may assign the wireless node 12 receiving the slot number message an assigned slot number 28A and may compute the frame time and slot time for the next frame as shown in 60. If there is no slot number message, the wireless node 12 may then go back to scanning for network messages as shown in 42.

If the wireless node 12 does not detect a network message, a determination is made if the network message is a range request message as shown in 62. If the network message is a range request message, the wireless node 12 may determine if there is a slot number message as shown in 58. If there is a slot number message, the wireless node 12 may store the slot information and compute the frame time and slot time for the next frame as shown in 60. If there is no slot number message, the wireless node 12 may then go hack to scanning for network messages as shown in 42. If the network message is not a range request message, the wireless node 12 then go back to scanning for network messages as shown in 42.

Figure 6:
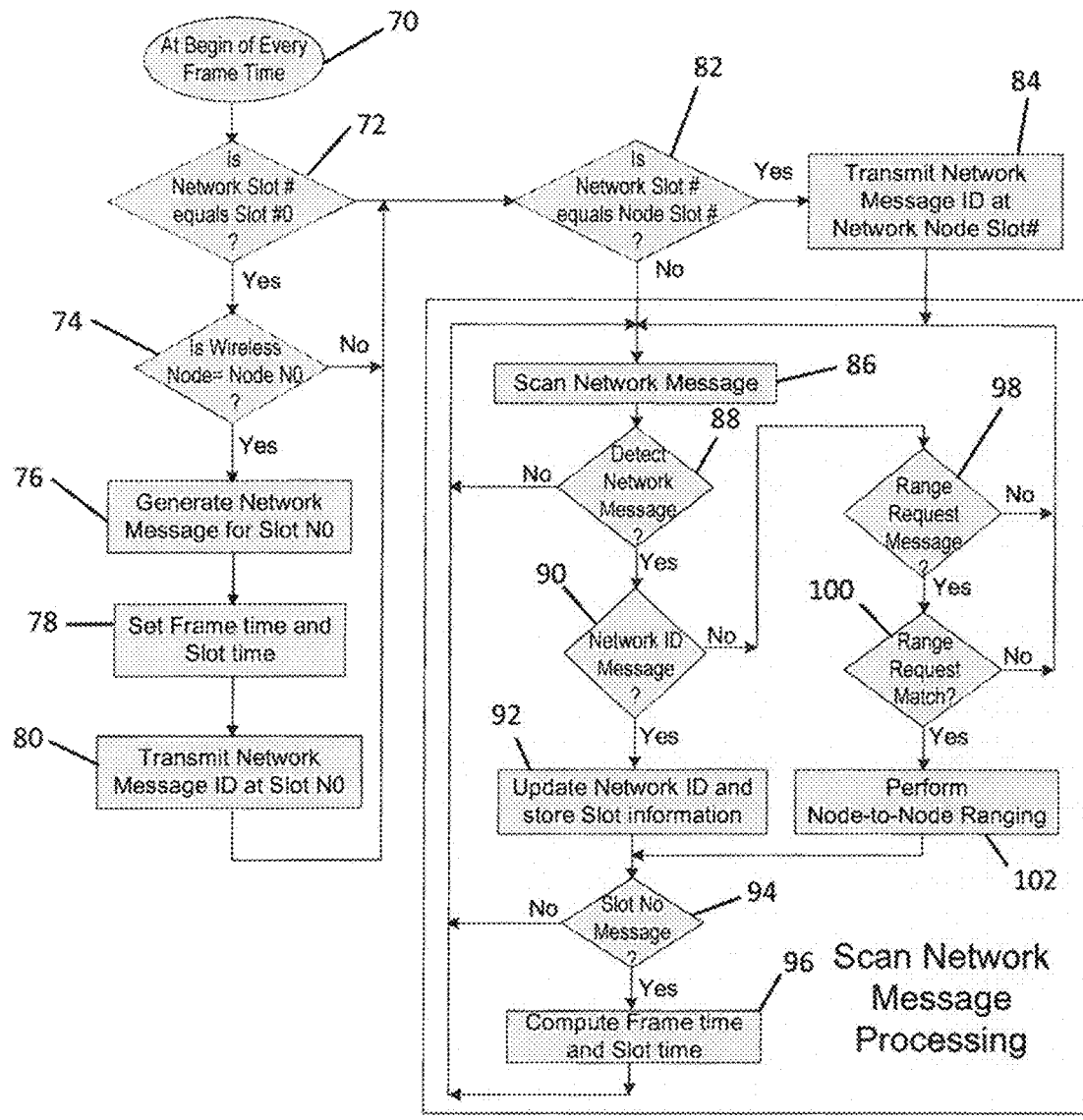
FIG. 6 is an exemplary flowchart showing network messaging processing, system time maintaining and wireless node to node ranging processing for the ad-hoc wireless network of FIG. 1 in accordance with one aspect of the present application.

Referring to FIG. 6, a flowchart may be seen showing network message processing, system time maintaining and wireless node-to-node ranging processing. At the beginning of every frame time 70 a determination is made by the wireless node 12 if the network slot # is equal to Slot N0 as shown in 72. If the network slot # is equal to Slot N0, a determination may be made if the wireless assigned node # is Node N0 as shown in 74. If the assigned node # is Node N0, a network message is generated for Slot N0 as shown in 76, the frame time and slot time are set as shown in 78 and network message generated may be sent in network slot N0 as shown in 80.

If a determination is made that the network slot # is not equal to Slot N0 as shown in 72, a determination is made if the network slot # is equal to the wireless assigned Node # as shown in 82. If the network slot # is equal to the wireless assigned Node #, a network ID message is generated and transmitted in the assigned slot 4 as shown in 84. The wireless node 12 may then scan for network messages as shown in 86. If the network slot # is not equal to the wireless assigned Node # as shown in 82, the wireless node 12 may scan for network messages as shown in 86.

After the wireless node 12 may scan for network messages as shown in 86, a determination may be made by the wireless node 12 if a network message has been detected as shown in 88. If no network message has been detected, the wireless node 12 goes back to scan for network messages as shown in 86. If a network message is detected, a determination is made if the network message is a network ID message as shown in 90. If the network message is a network ID message, the wireless node 12 decodes and processes the network ID message and updates and stores the network ID information as shown in 92. A determination may then be made if there is a slot message data as shown in 94. If there is slot message data, the wireless node 12 may compute the frame time and slot time as shown in 96. If there is no slot message data, the wireless node 12 may go back and scan for network messages as shown in 86.

If a determination is made that the network message detected is not a network ID message as shown in 90, the wireless node 12 determines if the network message is a range request message as shown in 98. If the network message is a range request message, the wireless node 12 makes a determination if the range request message is for that particular wireless node 12 as shown in 100. If the range request message is for that particular wireless node 12, a node-node ranging measurement is performed with the requested nodes as shown in 102. If the range request message is not for that particular wireless node 12, the wireless node 12 may go back and scan for network messages as shown in 86.

Figure 7:
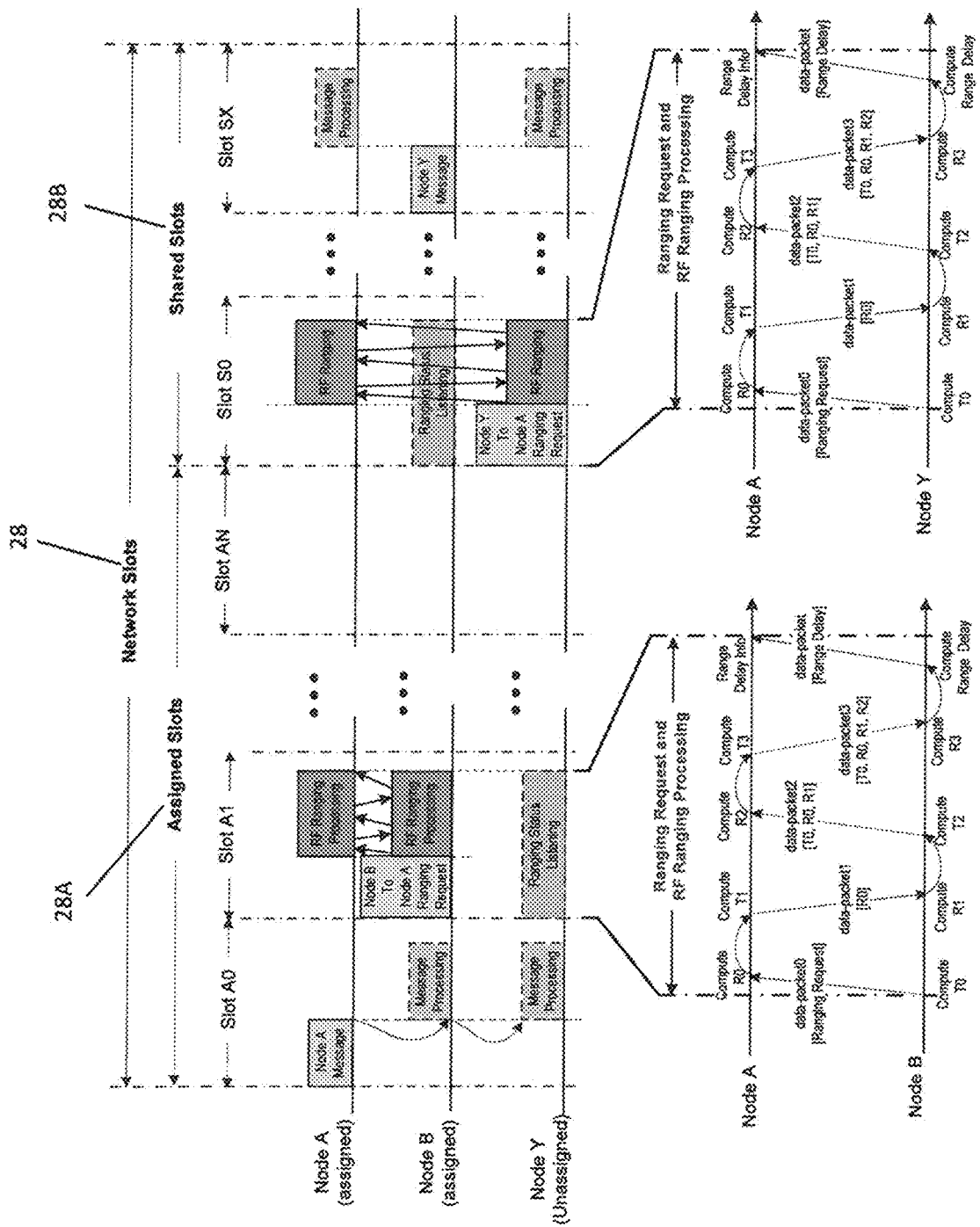
FIG. 7 is an exemplary timing diagram showing RF ranging protocol for the ad-hoc wireless network of FIG. 1 in accordance with one aspect of the present application.

Referring now to FIG. 7, the ranging between two wireless nodes, wireless Node A and wireless node B may be seen. It should be noted, that the ranging protocol is generally performed after the system 10 has been established and the network frame time and slot time has been set as described above.

In accordance with one embodiment, wideband signals UWB from the wireless nodes A and B may be used to estimate (measure) the time it takes to send and receive signals from one another and multiplies it by the speed of RF propagation (c, the speed of light) to approximate the range between the wireless nodes A and B.

As shown in FIG. 7, wireless nodes 12 identified as wireless Node A and Node B have, assigned network slots 28A labeled as Slots A0-A1. Thus, wireless nodes Node A and Node B may initiate and transmit network messages in their assigned network slots 28A (i.e., wireless Node A may transmit in Slot A0 and wireless Node B may transmit in assigned network slot A1) or in any shared network slots 28B identified as Shared Slots S0-SX. Wireless nodes 12 identified as wireless Node Y is an unassigned wireless node and may only initiate and transmit its network messages in any shared network slots 28B identified as Shared Slots S0-SX. The wireless nodes 12 identified as wireless Node A, Node B and Node Y may listen on any network slot at any time.

As may be seen in the present embodiment, wireless node A may send a network message in its assigned network slots 28A (i.e., wireless Node A may transmit in Slot A0). The other wireless nodes 12 identified as wireless Node B and Node Y may listen on the network slot, Slot A0 and process the network message initiated and transmitted by wireless Node A.

Wireless node B may send a range request data package to wireless node A in its assigned network slots 28A (i.e., wireless Node B may transmit in Slot A1) or in any shared network slots 28B identified as Shared Slots S0-SX. In the present embodiment, wireless node B may send a range request data package to wireless node A in its assigned network slots 28A identified as Slot A1 at time T0. Wireless node A may listen on any network slot at any time and may records the time R0 when the range request data package has been received. Wireless node A then sends a data package with the time R0 to wireless node A at a recorded time T1. Wireless node B records the time R1 when the data package with the time R0 has been received. Wireless node B at recorded time T2 may send a data package with the time T0, R0, R1 to wireless node A. Wireless node A records the time R2 when the data package with the data package of the times T0, R0, R1 has been received. Wireless node A then sends a data package with the time T0, T1 R0, R1, R2 to wireless node B at a recorded time T3. Wireless node B records the time R3 when the data package with the times T0, R0, R1, R2 has been received. Wireless node B may compute the time delay using the formula below:

$$\text{Transport Time From Node } B \text{ to Node } A = \frac{\frac{(R1-T0)-(T1-R0)}{2} + \frac{(R2-T1)-(T2-R1)}{2}}{2}$$

Once the over the air transport time has been calculated by wireless Node B, wireless Node B may send a data package with the time delay calculated to wireless node A. Any wireless node 12 can listen for their neighbor nodes slots for ranging activities and results at any time.

The ranging between wireless nodes 12 may further be done to aid in the location of the wireless nodes 12. As shown in FIG. 1, the wireless nodes 12 generally may not have a GPS receiver. However, the wireless nodes 12 may use triangulation between different wireless nodes 12 to determine a relative location of the different wireless nodes 12.

The foregoing description is illustrative of particular embodiments of the application, but is not meant to be a limitation upon the practice thereof. The following claims, including all equivalents thereof, are intended to define the scope of the application.

What is claimed is:

1. A method for establishing timing and processing a network messages in a wireless ad-hoc network comprising:

powering up of the wireless ad-hoc network having a plurality of nodes;

scanning by a first wireless node to determine if any network messages have been transmitted to determine if the wireless ad-hoc networks has been established;

establishing a network identification (ID) when the wireless ad-hoc network is unestablished by generating a network ID message by the first wireless node of the wireless ad-hoc network;

establishing a local timing in the wireless ad-hoc network allowing sending of communication messages between the plurality of wireless nodes in the wireless ad-hoc network, the local timing having a network data frame structure, each network data frame in the network data frame structure having a plurality of network slot times, wherein the first wireless node generates slot message data by setting network frame times and slot times for all wireless node in the wireless ad-hoc network establishing the local timing for the wireless ad-hoc network, wherein each network slot time is designated as one of an assigned network slot time or a shared network slot time, each wireless node in the wireless ad-hoc network designated as one of an assigned wireless node or an unassigned wireless node, wherein each assigned node has a different corresponding assigned network slot, each assigned wireless node initiating and transmitting network messages to one or more of the assigned wireless nodes or the unassigned wireless nodes in a corresponding individual assigned network slot time or any available shared network slot time when the corresponding individual assigned network slot is busy, and each unassigned wireless node initiating and transmitting network messages to one or more of the assigned wireless nodes or the unassigned wireless nodes only in any available shared network slot time, wherein the network messages transmitted by the assigned wireless node and the unassigned wireless node are one of command, status, range request or response messages, wherein the first wireless node is assigned a designated first slot time;

transmitting the network message ID and the slot message data established by the first wireless node in the designated first slot time establishing the local timing in the wireless ad-hoc network;

receiving and processing the network ID message during the designated first slot time by a second wireless node;

updating and storing a network information by the second wireless node;

storing slot information for the second wireless node by the second wireless node; and computing a frame time and a slot time of a next frame by the second wireless node.

2. The method of claim 1, comprising scanning for the network messages when the wireless ad-hoc network is established by the second wireless node and any other active nodes in the wireless ad-hoc network.

3. The method of claim 2, comprising:
detecting a range request message when the wireless ad-hoc network is established; and
computing a distance between an active wireless node sending the range request message and a desired wireless node.

4. The method of claim 1, comprising:
determining if a current network slot time is equal to an initial network slot time (SN0) at the beginning of each network data frame time;
determining if a current wireless node is an assigned wireless node corresponding to the initial network slot time (SN0);
generate a current network message by the current wireless node; and
transmit the current network message by the current wireless node during the initial network slot time (SN0).

5. The method of claim 4, comprising:
determining if the current wireless node is an assigned wireless node corresponding to a current network slot time (SN #) if the current network slot time is unequal to the initial network slot time (SN0); and
transmit network ID information by the current wireless node during the current network slot time (SN #) if the current wireless node is the assigned wireless node corresponding to the current network slot time (SN #).

6. The method of claim 4, comprising:
determining if the current wireless node is an assigned wireless node corresponding to a current network slot time (SN #) if the current network slot time is unequal to the initial network slot time (SN0);
scan for network messages if the current wireless node is not the assigned wireless node corresponding to the current network slot time (SN #).

7. The method of claim 4, comprising:
detecting a network message;
determining if the network message detected is a network ID message; and
update and store network ID data when a network ID message is detected.

8. The method of claim 7, comprising
storing network slot time information when a slot number messages is detected; and
computing a network frame time and a network slot time for a next network data frame.

9. The method of claim 7, wherein determining node to node ranging comprises:
sending a range request message from the active wireless node at a time T0 to the desired wireless node;
recording the time R0 when the range request message has been received by the desired wireless node;
sending a data package with the time R0 by the desired wireless node to the active wireless node sending the range request message at a recorded time T1;
recording a time R1 when the data package with the time R0 has been received by the active wireless node sending the range request message;
sending a data package with the time T0, R0, R1 by the active wireless node sending the range request message to the desired wireless node at a time T2;
recording a time R2 when the data package with the data package of the times T0, R0, R1 has been received by the desired wireless node;
sending a data package with the time T0, T1, R0, R1, R2 by the desired wireless node to the active wireless node sending the range request message at a time T3;
recording a time R3 when the data package with the times T0, T1, R0, R1, R2 has been received by the active wireless node sending the range request message; and
computing a distance between the active wireless node sending the range request message and the desired wireless node.

10. The method of claim 4, comprising:
detecting a network message;
determining if the network message detected is a range request message; and
performing node to node ranging between an active wireless node sending the range request message and a desired wireless node.

11. The method of claim 10, comprising sending a data package with the distance from the active wireless node sending the range request message to the desired wireless node.

12. The method of claim 10, wherein the active wireless node sending the range request message computes the distance using the formula:

$$\text{Distance} = \frac{\frac{(R1-T0)-(T1-R0)}{2} + \frac{(R2-T1)-(T2-R1)}{2}}{2}.$$

13. The method of claim 1, wherein the plurality of network slot times is divided into a plurality of assigned network slot times and a plurality of shared network slot times.

\* \* \* \* \*